US012072724B2

(12) United States Patent
Pons

(10) Patent No.: US 12,072,724 B2
(45) Date of Patent: Aug. 27, 2024

(54) INRUSH CURRENT OF AT LEAST ONE LOW DROP-OUT VOLTAGE REGULATOR

(71) Applicant: STMicroelectronics (Grenoble 2) SAS, Grenoble (FR)

(72) Inventor: Alexandre Pons, Vizille (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 169 days.

(21) Appl. No.: 17/453,815

(22) Filed: Nov. 5, 2021

(65) Prior Publication Data

US 2022/0187864 A1 Jun. 16, 2022

(30) Foreign Application Priority Data

Dec. 11, 2020 (FR) ........................................ 2013087

(51) Int. Cl.
*G05F 1/575* (2006.01)

(52) U.S. Cl.
CPC .................................... *G05F 1/575* (2013.01)

(58) Field of Classification Search
CPC .......... G05F 1/462; G05F 1/466; G05F 1/468; G05F 1/563; G05F 1/465; G05F 1/56; G05F 1/575; G05F 1/562; G05F 1/565; G05F 1/567; G05F 1/569; G05F 1/571; G05F 1/573; G05F 1/5735; H02M 1/005
See application file for complete search history.

(56) References Cited

U.S. PATENT DOCUMENTS

| | | | | |
|---|---|---|---|---|
| 6,208,127 | B1 * | 3/2001 | Doluca | G05F 1/575 323/349 |
| 6,559,623 | B1 * | 5/2003 | Pardoen | G05F 1/573 323/273 |
| 7,215,103 | B1 * | 5/2007 | Wong | G05F 1/573 323/279 |
| 7,276,885 | B1 | 10/2007 | Tagare | |
| 7,511,464 | B2 | 3/2009 | Suzuki | |
| 8,716,993 | B2 * | 5/2014 | Kadanka | G05F 1/565 323/280 |
| 9,454,164 | B2 * | 9/2016 | Bhattad | G05F 1/56 |
| 9,667,130 | B2 | 5/2017 | Gonthier et al. | |
| 9,766,642 | B2 * | 9/2017 | Pons | G05F 1/573 |
| 9,774,257 | B2 * | 9/2017 | Wibben | H05B 45/10 |
| 9,778,667 | B2 | 10/2017 | Peluso | |
| 10,594,202 | B1 | 3/2020 | Routledge | |
| 10,971,925 | B2 | 4/2021 | Lebon et al. | |
| 11,409,313 | B2 * | 8/2022 | Jiang | G05F 1/56 |

(Continued)

FOREIGN PATENT DOCUMENTS

| | | |
|---|---|---|
| CN | 101109971 A | 1/2008 |
| CN | 105408829 A | 3/2016 |

(Continued)

*Primary Examiner* — Thienvu V Tran
*Assistant Examiner* — Nusrat Quddus
(74) *Attorney, Agent, or Firm* — Slater Matsil, LLP

(57) ABSTRACT

The present disclosure relates to a device comprising: N low drop-out voltage regulators, N being an integer greater than or equal to 1; a first circuit configured to deliver N set-point voltages to the N regulators which are proportional to the same first current; and a second circuit configured to deliver the first current, wherein the first current is proportional to a reference current modulated based on a sum of the inrush currents of the N regulators.

20 Claims, 3 Drawing Sheets

(56) References Cited

U.S. PATENT DOCUMENTS

| | | | | |
|---|---|---|---|---|
| 2009/0115379 | A1* | 5/2009 | Al-Shyoukh | G05F 1/56 323/238 |
| 2009/0160251 | A1 | 6/2009 | Mok et al. | |
| 2009/0273323 | A1* | 11/2009 | Kimura | G05F 1/56 323/265 |
| 2010/0289472 | A1 | 11/2010 | Renous | |
| 2013/0033104 | A1* | 2/2013 | Gunther | G05F 1/56 307/31 |
| 2013/0049721 | A1* | 2/2013 | Lo | G05F 1/575 323/280 |
| 2013/0113454 | A1* | 5/2013 | Chen | G05F 1/56 323/312 |
| 2013/0147448 | A1* | 6/2013 | Kadanka | G05F 1/565 323/280 |
| 2013/0293986 | A1* | 11/2013 | Lerner | G05F 1/573 361/18 |
| 2016/0209854 | A1* | 7/2016 | Yen | G05F 3/30 |
| 2018/0307259 | A1 | 10/2018 | Ogura | |
| 2019/0146530 | A1* | 5/2019 | Kotrc | G05F 1/562 323/265 |
| 2019/0146532 | A1* | 5/2019 | Ballarin | G05F 1/462 323/283 |
| 2020/0064875 | A1* | 2/2020 | Gonapati | G05F 1/573 |
| 2020/0201373 | A1* | 6/2020 | Koay | G05F 1/59 |
| 2020/0387186 | A1 | 12/2020 | Chen | |
| 2021/0018944 | A1* | 1/2021 | Matyscak | G05F 1/565 |
| 2021/0080985 | A1* | 3/2021 | Shreepathi Bhat | G05F 1/575 |
| 2021/0247790 | A1* | 8/2021 | Wu | H04R 3/00 |
| 2022/0057822 | A1* | 2/2022 | Zamarreno Ramos | G05F 1/461 |
| 2022/0197321 | A1* | 6/2022 | Tiagaraj | G05F 1/575 |
| 2022/0206519 | A1* | 6/2022 | Zhong | G05F 1/461 |
| 2022/0271649 | A1* | 8/2022 | Kirchner | H02M 3/157 |
| 2022/0397925 | A1* | 12/2022 | Tiruvamattur | G05F 1/567 |
| 2023/0273633 | A1* | 8/2023 | Chandrasekaran | H02M 1/08 363/13 |
| 2023/0324940 | A1* | 10/2023 | Singh | G05F 1/567 323/280 |

FOREIGN PATENT DOCUMENTS

| | | | |
|---|---|---|---|
| CN | 105846661 | A | 8/2016 |
| CN | 109298743 | A | 2/2019 |
| CN | 111585428 | A | 8/2020 |
| EP | 3591494 | A1 | 1/2020 |
| JP | 2013025577 | A | 2/2013 |
| JP | 2013061941 | A | 4/2013 |

* cited by examiner

INRUSH CURRENT OF AT LEAST ONE LOW DROP-OUT VOLTAGE REGULATOR

CROSS-REFERENCE TO RELATED APPLICATIONS

This application claims priority to French Patent Application No. FR 2013087, filed on Dec. 11, 2020, which application is hereby incorporated by reference herein in its entirety.

TECHNICAL FIELD

The present disclosure generally relates to electronic devices and, in particular embodiments, to managing an inrush current of at least one low drop-out voltage regulator provided in electronic devices.

BACKGROUND

Electronic devices, particularly integrated, having at least one low drop-out (LDO) voltage regulator, are known. The regulator(s), when powered on, each draw an inrush current. When not controlled, such inrush currents may raise an issue.

In particular, when the regulators are powered with the same power supply voltage, for example, delivered by an AC/DC or DC/DC voltage converter, inrush currents drawn by the regulators may cause a variation of the power supply voltage, which may result in malfunctions such as a failure of the converter delivering the power supply voltage to the regulators.

It would be advantageous to overcome all or part of the disadvantages due to the inrush current of one or a plurality of low drop-out voltage regulators.

SUMMARY

An embodiment overcomes all or part of the disadvantages of known solutions of managing the inrush current of one or a plurality of low drop-out voltage regulators.

One embodiment provides a device having: N low drop-out voltage regulators, N being an integer greater than or equal to 1; a first circuit configured to deliver N set-point voltages to the N regulators which are proportional to the same first current; and a second circuit configured to deliver the first current, where the first current is proportional to a reference current modulated based on a sum of the inrush currents of the N regulators.

According to an embodiment, the second circuit is configured so that the first current increases in absolute value when the sum decreases.

According to an embodiment, the second circuit is configured to receive the reference current and includes a first node configured to receive a second current proportional to the reference current; and a third circuit configured to draw a third current from the first node, the third circuit configured so that the third current varies with the sum, the second circuit being further configured to deliver the first current and so that the first current is proportional to a fourth current drawn from the first node.

According to an embodiment, the third circuit is configured so that an absolute value of the third current increases when the sum increases.

According to an embodiment, the second and third currents are both positive or negative.

According to an embodiment, the N regulators are configured to be powered with the same power supply voltage.

According to an embodiment, the third circuit includes: a second node configured to receive the power supply voltage and a third node configured to receive a reference voltage; a first transistor having a drain and a gate connected together and coupled to a fourth node; a first switch coupling the fourth node to the second node; a second switch in series with the first transistor between the fourth node and the third node; a circuit configured to draw a current proportional to the reference current from the fourth node; for each of the N regulators, a capacitor coupling an output of the regulator to the fourth node; and a second transistor having a drain coupled to the first node, a gate connected to the fourth node, and a source coupled to the third node.

According to an embodiment, the device includes a control circuit of the first and second switches configured to turn off the first switch and turn on the second switch during a powering on of the N regulators.

According to an embodiment, the control circuit is further configured to turn on the first switch and turn off the second switch before the powering on of the N regulators.

According to an embodiment, for each of the N regulators, the capacitor coupling the output of the regulator to the fourth node is at least 1 000 000 times smaller, preferably 10 000 000 times smaller, than an equivalent capacitor of a load connected to the output of the regulator.

According to an embodiment, a dimension ratio of the second transistor is at least 30 larger, preferably 50 times larger, than the dimension ratio of the first transistor.

According to an embodiment, the device includes a circuit configured to receive the reference current and deliver the second current to the first node.

According to an embodiment, the device includes a voltage converter configured to deliver the power supply voltage.

According to an embodiment, for each of the N set-point voltages, the first circuit includes a resistor and is configured to conduct a fifth current proportional to the first current through the resistor, the set-point voltage being available between the terminals of the resistor.

According to an embodiment, the first circuit includes a current mirror having an input branch configured so that a current proportional to the first current flows therethrough, and N output branches, each of the N output branches having one of the N resistors and being configured so that the fifth current flows through the resistor.

BRIEF DESCRIPTION OF THE DRAWINGS

Other advantages and features of the disclosure will become apparent upon examining the detailed description of implementations and embodiments, which are in no way limiting, and of the appended drawings wherein.

DETAILED DESCRIPTION OF ILLUSTRATIVE EMBODIMENTS

Like features have been designated by like references in the various figures. In particular, the structural and/or functional features common among the various embodiments may have the same references and may dispose identical structural, dimensional, and material properties.

For the sake of clarity, only the steps and elements that are useful for an understanding of the embodiments described herein have been illustrated and described in detail. In particular, the various usual electronic circuits, particularly integrated, where at least one low drop out voltage regulator is provided have not been detailed, the described embodiments being compatible with such usual circuits.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially," and "in the order of" signify within 10% and preferably within 5%.

In the following description, a current is said to be drawn from a node when the current comes out of the node, and is said to be supplied to a node when the current flows towards the node—regardless that the current may be positive or negative.

In the following description, unless specified otherwise, when it is indicated that a signal, for example, a current or a voltage, is proportional to another signal, this includes the case where the signals are equal, for example, identical.

Figure 1:
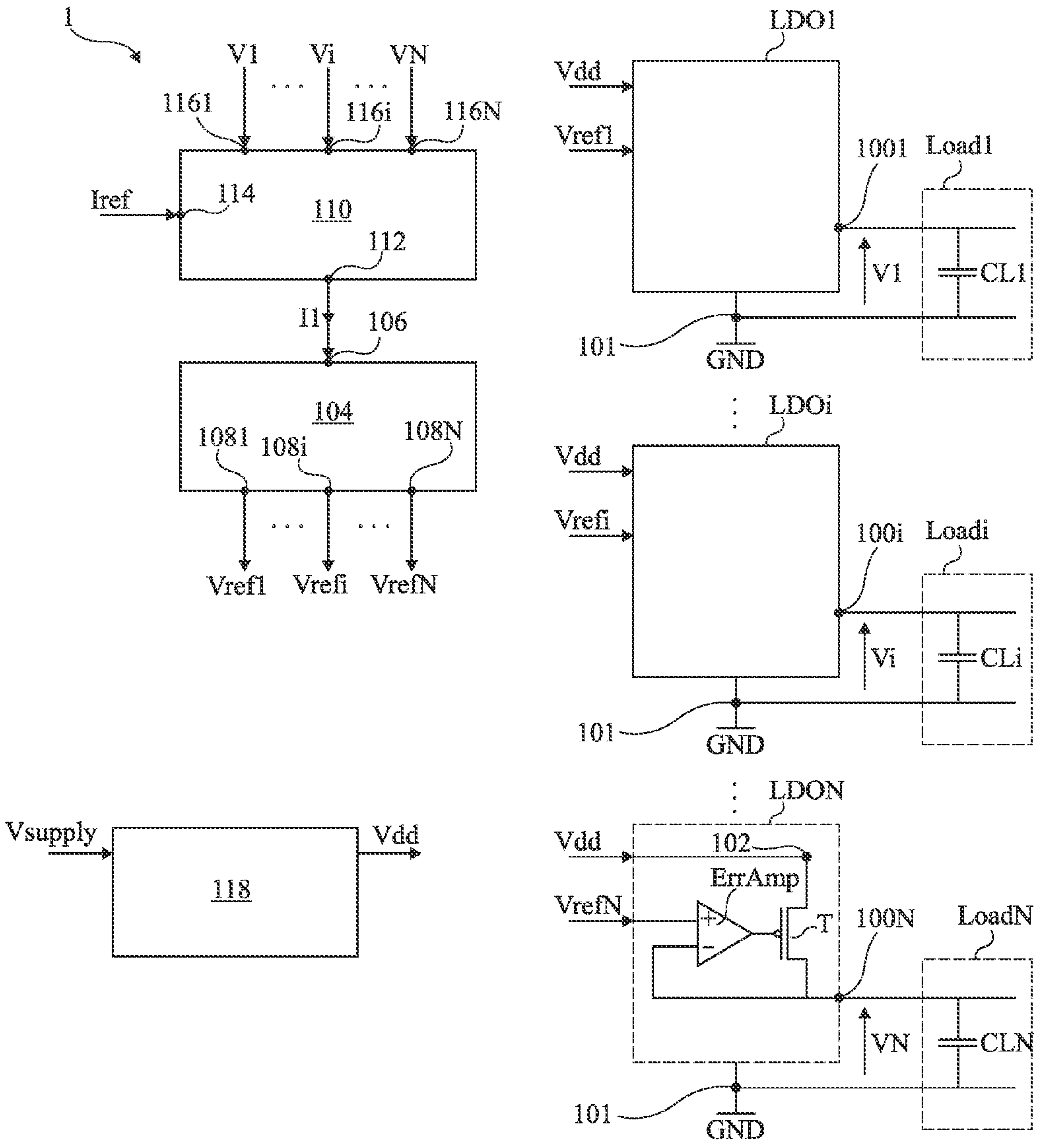
FIG. 1 is a schematic of an embodiment device having at least one low drop-out voltage regulator.

FIG. 1 very schematically shows in the form of blocks an embodiment of a device 1 having N low drop-out voltage regulators LDOi, i being an integer index in the range from 1 to N, and N being an integer greater than or equal to 1.

In the example of FIG. 1, the number N of regulators LDOi is greater than 1, for example, at least equal to 3. Further, to avoid overloading the drawing, only regulators LDO1, LDOi, and LDON have been shown.

Each regulator LDOi is configured to receive a power supply voltage Vdd, referenced to a reference voltage, in the present example, ground GND. As an example, voltage Vdd is positive.

Each regulator LDOi is configured to receive a corresponding set-point voltage Vrefi. Each regulator LDOi is further configured to deliver an output voltage Vi at a value determined by voltage Vrefi. Voltages Vrefi and Vi are referenced to reference voltage GND and are, for example, positive. Voltages Vrefi are, for example, different from one another.

As an example, each regulator LDOi powers a corresponding load Loadi. Each load Loadi is connected to an output 100*i* of the corresponding regulator LDOi, where voltage Vi is available. For example, each load Loadi includes a capacitive component CLi between the corresponding output 100*i* and a node 101 at reference voltage GND or, in other words, each regulator LDOi sees, on its output 100*i*, the equivalent capacitance CLi of the load Loadi connected to this regulator.

An embodiment of regulators LDO1 to LDON has been detailed in FIG. 1, only for regulator LDON to avoid overloading the drawing. As an example, all regulators LDO1 to LDON are identical or similar, the indices of the references used hereafter in relation with regulator LDON being adapted according to the concerned regulator LDOi.

According to this example embodiment, regulator LDON includes an error amplifier ErrAmp and a MOS (Metal Oxide Semiconductor) transistor T controlled by an output signal of amplifier ErrAmp. Error amplifier ErrAmp is configured so that its output signal varies with a voltage difference between its two inputs. As such, its output signal is representative of such a voltage difference.

Transistor T has a conduction terminal coupled, for example, connected, to a node 102 at voltage Vdd, and another conduction terminal coupled, for example, connected, to the output terminal 100N of regulator LDON, the control terminal, or gate, of transistor T being connected to the output of amplifier ErrAmp.

Error amplifier ErrAmp has an input configured to receive a voltage proportional to voltage VN and another input configured to receive a voltage proportional to voltage VrefN. Transistor T is then controlled so that the voltage drop thereacross enables to obtain voltage VN at the desired value.

In the example of FIG. 1, transistor T has an N channel and has its source connected to node 102, its drain being connected to output terminal 100N. Further, in the example of FIG. 1, voltage VrefN is received by the non-inverting input (+) of amplifier ErrAmp of regulator LDON, the inverting input (–) of this amplifier ErrAmp receiving voltage VN.

Device 1 further includes a circuit 104 configured to deliver voltages Vref1 to VrefN from the same current I1. More particularly, all voltages Vref1 to VrefN are proportional to current I1. For example, each voltage Vrefi corresponds to the voltage across a resistor conducting a current proportional to current I1 As an example, current I1 is positive.

In embodiments, circuit 104 includes a current mirror (not shown in FIG. 1) having an input branch and N output branches. The input branch of the current mirror is then configured so that a current proportional to current I1 flows therethrough, and each of the N output branches includes a resistor and is configured so that a current proportional to the current in the input branch, and thus proportional to current I1, flows therethrough.

Current I1 is received by an input terminal, or node, 106 of circuit 104. Each voltage Vrefi is available on a corresponding output terminal, or node, 108*i* of circuit 104. In other words, circuit 104 includes N output nodes 1081, . . . , 108*i*, . . . , 108N delivering the respective voltages Vref1, . . . , Vrefi, . . . , VrefN.

Device 1 includes a circuit 110 configured to supply current I1. More particularly, circuit 110 is configured so that, at the powering ON of regulators LDO1 to LDON, current I1 is proportional to a reference current Iref modulated based on a sum of the inrush currents of the N regulators LDO1 to LDON. In other words, circuit 110 is configured to generate a current proportional to reference current Iref, and to modulate, or vary, the generated current based on the sum of the inrush currents of regulators LDO1 to LDON. Current I1 is then proportional to this modulated current. Current I1 is, for example, available on an output terminal 112 of circuit 110. Terminal 112 is coupled, preferably connected, to input terminal 106 of circuit 104.

Current Iref is constant. As an example, current Iref is supplied from a bandgap voltage source. Current Iref is received by an input terminal 114 of circuit 110.

According to an embodiment, circuit 110 is more particularly configured so that, at the powering on of regulators LDO1 to LDON, current I1 increases when the sum of the inrush currents of regulators LDO1 to LDON decreases. Preferably, circuit 110 is further configured so that current I1 is null at the very beginning of the power-on phase of regulators LDO1 to LDON, when the inrush currents are maximum, increases when the inrush currents decrease, and reach a nominal value at the end of the power-on phase, when the inrush currents are null.

Because current I1 increases when the sum of the inrush currents decreases, the more the sum of the inrush currents decreases rapidly, the more current I1, and thus voltages Vref1 to VrefN, increase rapidly. Conversely, the slower the sum of the inrush currents decreases, the slower current I1, and thus voltage Vref1 to VrefN, increase. This enables the increase of voltages Vref1 to VrefN to be relatively slow when the sum of the currents is relatively high and thus does not further increase inrush currents. This results in a limiting of the maximum value that the sum of the inrush currents may reach.

For example, this enables to limit the maximum amplitude of the variations of voltage Vdd which would result from such inrush currents and thus, for example, to avoid malfunctions of an electronic circuit having device 1.

In steady-state, the inrush currents of regulators LDO1 to LDON are null, set-point voltages Vref1 to VrefN are then only determined by the value of current Iref and, for example, by the values of the resistors of circuit 104 across which voltages Vref1 to VrefN are available.

According to an embodiment, circuit 110 is configured to generate a signal, preferably a current, having its value varying with the sum of the inrush currents of regulators LDO1 to LDON. Circuit 110 is, for example, configured to generate this signal representative of the sum of the inrush currents of regulators LDO1 to LDON based on the output voltages Vi to VN of regulators LDO1 to LDON. Circuit 110 then includes N terminals or input nodes 116*i*, each receiving a corresponding voltage Vi.

According to an embodiment, power supply voltage Vdd is delivered by an AC/DC or DC/DC type voltage converter 118, for example, of DC/DC type. Converter 118 receives a voltage Vsupply from a power source, and generates voltage Vdd from voltage Vsupply.

In device 1, because the amplitude of the variations of voltage Vdd resulting from the inrush currents of regulators LDO1 to LDON is limited, this enables to avoid for voltage Vdd to reach low values for which converter 118 would enter a configuration mode, which would cause a malfunction of an electronic system having device 1. This also enables to avoid for voltage Vdd to reach values lower than a low threshold of converter 118 below which converter 118 would stop delivering voltage Vdd.

To limit the inrush currents of regulators LDO1 to LDON, it could have been to suppress circuit 100, so that current I1 is constant and proportional to current Iref, and to provide low-pass RC filters between each terminal 108*i* of circuit 104 and the corresponding regulator LDOi. Voltages Vrefi would then have progressively increased during the powering on of regulators LDO1 to LDON.

However, the low-pass RC filters would then have needed to have a relatively high time constant. This would have required relatively high resistance and capacitance values, which would have resulted in an unwanted increase of the surface area of device 1.

Further, the provision of a low-pass RC filter on an input of each regulator LDOi would have caused instabilities and/or noise in the regulation of voltages Vi by regulators LDOi. It could then have been devised to short-circuit the low-pass RC filters once the steady-state has been established. This would, however, have resulted in providing additional switches, which would have caused, on the one hand, an unwanted increase in the surface area of the device and, on the other hand, unwanted transient phenomena at the turning on of the switches.

An embodiment where current I1 is positive has been described hereabove. As a variant, current I1 may be negative, for example, by providing for each voltage Vref1 to be equal to the product of current I1 by a negative proportionality factor. In such a variant, current I1 increases in absolute value when the sum of the inrush currents of regulators LDO1 to LDON decreases. Thus, in this variant and as in the previously described embodiment, during the powering ON of regulators LDO1 to LDON, voltages Vrefi increase as the sum of the inrush currents decreases.

Figure 2:
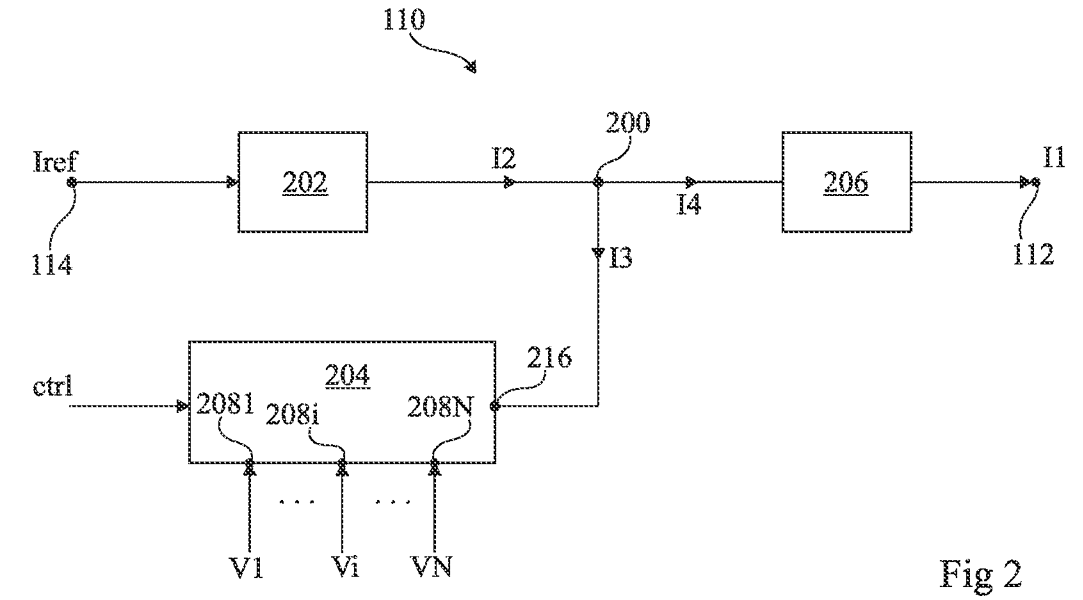
FIG. 2 is a schematic of an embodiment circuit of the device of FIG. 1.

FIG. 2 very schematically shows in the form of blocks an embodiment of the circuit 110 of FIG. 1.

Circuit no includes an inner node 200. Node 200 is configured to receive a current I2 proportional to the current Iref received on the input terminal 114 of circuit 110. In other words, circuit 110 is configured to deliver current I2 to node 200. As an example, circuit 110 includes a current-copying circuit 202 configured to generate current I2 from current Iref. Circuit 202 is, for example, implemented from one or a plurality of current mirrors (not shown).

Circuit no further includes a circuit 204. Circuit 204 is coupled, preferably connected, to node 200. Circuit 204 is configured to draw a current I3 from node 200. According to an embodiment, currents I3 and I2 are both positive, although, as a variant, the two currents may both be negative. Circuit 204 is configured so that current I3 varies with the sum of the inrush currents of regulators LDOi (FIG. 1). Circuit 204 includes an output terminal, or node, 210 from which circuit 204 draws current I3, output terminal 210 being coupled preferably connected, to node 200.

Circuit no is further configured to deliver current I1 to its output terminal from a current I4 drawn from node 200. Specifically, circuit 110 is configured so that current I1 is proportional to the current I4 drawn from node 200. For example, circuit 110 includes a current-copying circuit 206 configured to generate current I1 from the current I4 that it draws from node 200. Circuit 206 is, for example, implemented from one or a plurality of current mirrors.

According to an embodiment, circuit 204 is configured, during a powering on of regulators LDO1 to LDON, so that the absolute value of current I3 decreases when the sum of the inrush currents decreases. Thus, current I4, equal to constant current I2 minus current I3, increases in absolute value when the sum of the inrush currents decreases, whereby the absolute value of current I1 increases in absolute value when the sum of the inrush currents decreases.

As an example, circuit 204 is configured to supply current I3 from the output voltages Vi of regulators LDOi (FIG. 1). Circuit 204, for example, includes N inputs 2081, . . . , 208*i*, . . . , 208N configured to receive the N respective voltages V1, . . . , Vi, . . . , VN. Inputs 208*i* are then coupled, for example, connected, to the corresponding inputs 108*i* of circuit 110 (FIG. 1), and thus to the corresponding outputs 100*i* of regulators LDOi.

According to an embodiment, circuit 204 is configured, during a powering on of regulators LDOi, to first draw a current I3 equal to current I2, so that current I1 is null. As a result, voltages Vrefi (FIG. 1), and thus voltages Vi, are null. Then, when the sum of the inrush currents starts decreasing, current I3 also starts decreasing in absolute value, whereby current I4 starts increasing in absolute value. Thus, current I1 starts increasing in absolute value, whereby voltages Vrefi start increasing. At the end of the powering on of regulators LDOi, when the steady-state is reached, and the inrush currents are null, circuit 204 is configured so that current I3 is null. Current I1, and thus voltages Vrefi, are then determined by reference current Iref, which is constant.

According to an embodiment, circuit 204 is configured to receive a binary control signal ctrl, having its switching from a first binary state to a second binary state indicating, or corresponding to, the powering on of regulators LDOi. Signal ctrl is, for example, supplied by a control circuit (not shown) belonging, for example, to device 1 (FIG. 1).

Figure 3:
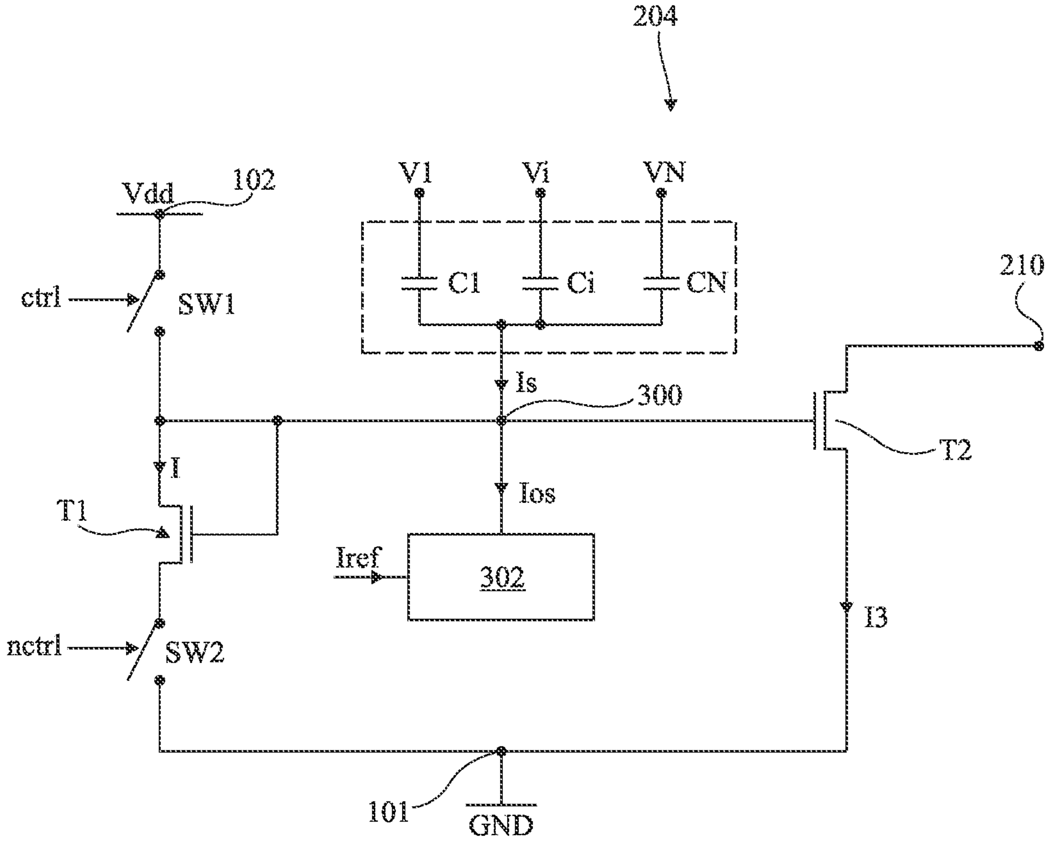
FIG. 3 is a schematic of an embodiment portion of the circuit of FIG. 2.

FIG. 3 schematically shows an embodiment of circuit 204 of FIG. 2. Circuit 204 includes a MOS transistor T1, for example, with an N channel, having its gate and its drain connected together and coupled, for example, connected, to an inner node 300 of circuit 204.

Circuit 204 further includes a switch SW1 coupling node 300 to node 102, and a switch SW2 in series with transistor T1, between node 300 and node 101. In this example, switch SW2 is connected between the source of transistor Ti and node 101, and switch SW1 is connected between nodes 102 and 300. Switches SW1 and SW2 are controlled from signal ctrl so that switches SW1 and SW2 are respectively on and off when regulators LDOi are powered off and are switched to the respectively off and on states when regulators LDOi are powered on, that is, when signal ctrl switches from its first binary state to its second binary state. As an example, switch SW1 is controlled by signal ctrl and switch SW2 is controlled by a signal nctrl corresponding to the binary complementary of signal ctrl.

Circuit 204 further includes a circuit 302 configured to draw a current Ios from node 300. Circuit 302 is configured so that current Ios is proportional to reference current Iref. As an example, current Ios is positive.

Circuit 204 includes a MOS transistor T2 having a channel of the same type as that of transistor T1. Transistor T2 has its gate connected to the gate of transistor T1 and its source connected to the node 101 to which the source of transistor T1 is also coupled. Thus, transistors T1 and T2 are assembled as a current mirror. Further, the drain of transistor T2 is coupled, for example, to output terminal 210 of circuit 204, or, in other words, the drain of transistor T2 is coupled to node 200 (FIG. 2). Transistor T2 is configured so that current I3 flows between its conduction terminals, from node 210 to node 101.

For each regulator LDOi (FIG. 1), circuit 204 includes a corresponding capacitor Ci, coupling the corresponding terminal 208*i* of circuit 204 to node 300, that is, coupling the output 100*i* of the corresponding regulator LDOi to node 300. Call Is the current supplied to node 300 by the assembly of capacitors Ci, that is, current Is is equal to the sum of the currents in capacitors C1 to CN.

The operation of device 1, implemented with the circuits 110 and 204 described in relation with respective FIGS. 2 and 3, is the following. To simplify the description of this operation, the case where N is equal to 1, that is, the case where the device 1 of FIG. 1 only includes regulator LDO1, is first considered.

Initially, regulator LDO1 is off, and its output voltage Vi is null. Further, switches SW1 and SW2 are respectively on and off, and the voltage of node 300 is equal to Vdd. As a result, capacitor C1 is precharged to voltage Vdd, a current I in transistor T1 is null, and voltage Vref1 is null.

When regulator LDO1 is powered on, signal ctrl is switched, which results in the turning on of switch SW2 and the turning off of switch SW1.

In the first phase, capacitor Ci discharges through transistor T1 and the voltage Vdd of node 300 progressively decreases. In this first phase, the current I in transistor T is relatively high, whereby current I3 is also relatively high, and the entire current I2 is drawn to node 200 by circuit 204. Current I1 is then null, which results in voltage Vref1 being null.

In a second phase, which, for example, starts when the voltage of node 300 reaches the value of the turn-on threshold of transistor T1, current I starts decreasing and current I3, which becomes, in absolute value smaller than current I2. Current I1 then starts increasing. Voltage Vref1 then starts increasing and voltage Vi, and regulator LDO1 draws an inrush current Irush1 from node 102. Current Irush1 is equal to CL1*dV1/dt. In practice, the variations of the gate-source voltage of transistor T1 are slow as compared with that of voltage V1, and the current Is in capacitor C1 may be approximated by C1/CL1*Irush1. Current I being equal to current Is minus current Ios, current I3 is then equal to n*(Is−Ios), n being the ratio of the dimension ratio of transistor T2 to the dimension ratio of transistor T1. In other words, current I3 is equal to n*(C1/CL1*Irush1−Ios). Current I3 thus effectively varies with the inrush current Irush1 of regulator LDO1, and, more particularly, decreases in absolute value when inrush current Irush1 decreases.

Further, in this second phase, voltage V1 follows voltage Vref1, which is proportional to current I1, and thus to I2−n*(C1/CL1*Irush1−Ios). Voltage V1 is thus equal to K*(I2−n*(C1*(dV1/dt)−Ios)), K being the proportionality factor between voltage V1 and current I1. By solving the differential equation on V1, it is obtained that V1 is equal to $K*(I2+n*Ios)*(1-e^{-t/(n*K*C1)})$. It can be deduced that current Irush1 is at most equal to (CL1/n*C1)*(I2+n*Ios).

For a given equivalent capacitance value CL1, the maximum value of inrush current Irush1 is then determined by the values of ratio n, of capacitor C1, and of currents C2 and Ios.

Once the steady-state has been reached, that is, voltage Vref1 has reached its nominal value, and voltage V1 is equal to the set-point value determined by this nominal value of Vref1, current Irush1, and thus current Is, are null. Current Ios then enables to maintain current I3 null. Because current I3 is null, current I1 is determined by current Iref.

An advantage of this embodiment of circuit 204 is that it is not necessary to detect the end of the powering-on of regulator LD1 to deactivate circuit 204 and thus force current I3 to a null value.

According to an embodiment, ratio n is selected to be greater than or equal to 30, or even greater than or equal to 50. This enables a relatively low maximum inrush current Irush1 by using a capacitor C1 of relatively low value, for example, at least 1 000 000 smaller than capacitance CL1, or at least 10 000 000 smaller than capacitance CLi.

In the case where N is greater than 1, the operation of device 1 implemented with the circuits 110 and 204 described in relation with respective FIGS. 2 and 3 can be deduced from the operation described in the case where N is equal to 1. In the case where N is greater than 1, as previously, it is possible to select a maximum value for the sum of the inrush currents of regulators LDOi, by setting the values of ratio n, of capacitors Ci, of current I2, and of current Ios.

An embodiment where current Is, current Ios, and current I3 are positive has been described hereabove in relation with FIG. 3. As a variant, currents Is and Ios are positive and current I3 is negative. In this variant, the drain of transistor T2 is, for example, coupled to node 210 by at least one current mirror enabling to supply negative current I3 from the current flowing through transistor T2.

Figure 4:
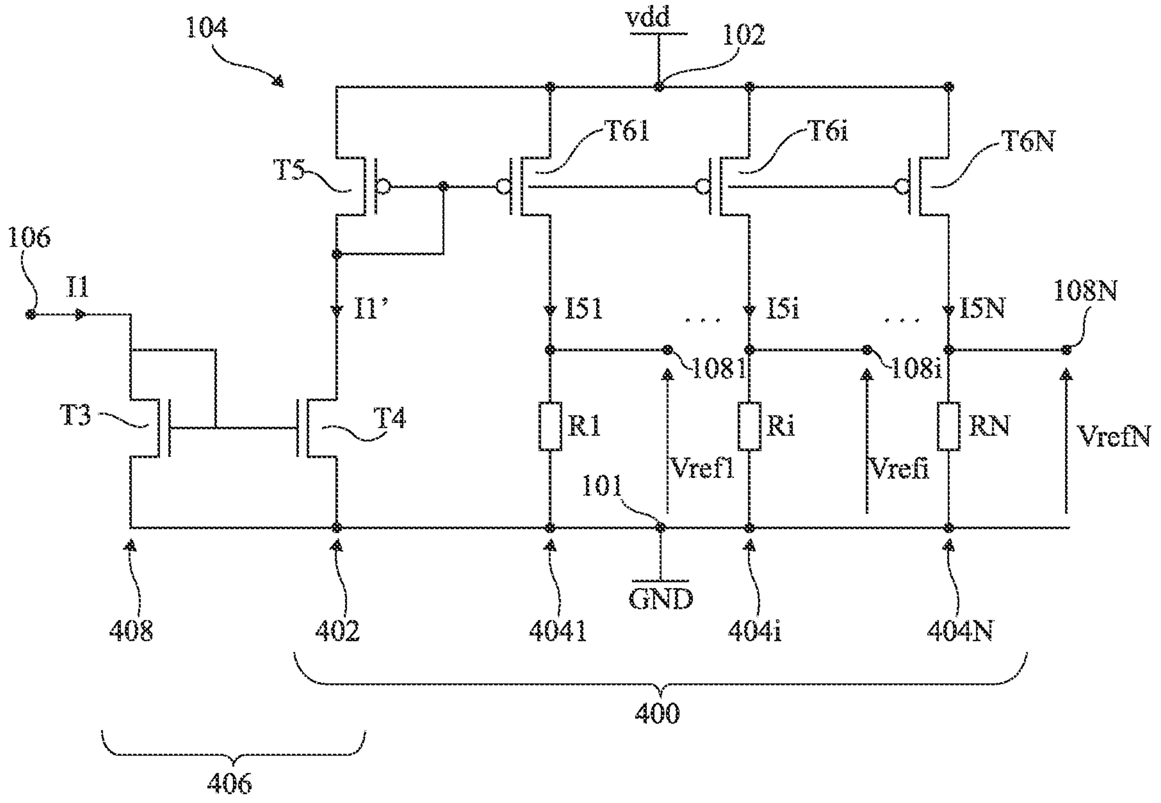
FIG. 4 is a schematic of another embodiment circuit of the device of FIG. 1.

FIG. 4 schematically shows an embodiment of circuit 104 of FIG. 1. In this embodiment, circuit 104 includes a current mirror 400 having an input branch 402 and N output branches 404*i*.

Branch 402 is configured so that a current I1' proportional to current I1 flows therethrough. For example, the input branch 402 of current mirror 400 is also the output branch of a current mirror 406 having an input branch 408 coupled to the input terminal 106 of circuit 104 so that current I1 flows through branch 402.

Each output branch 404*i* includes a corresponding resistor Ri, the value of resistance Ri determining, with current I1, the corresponding value of voltage Vrefi.

More particularly, each branch 404*i* is configured so that a current I5*i* proportional to current I1', and thus to current I1, flows therethrough. As an example, in each branch 404*i*, resistor Ri is connected between node 101 and the corresponding output of circuit 104, so that voltage Vref1 is equal to I5*i**Ri.

As an example, the input branch 408 of current mirror 406 includes a MOS transistor T3, for example, with an N channel, connected between input terminal 106 and node 101. In this example, the branch 402 common to the two current mirrors 404 and 406 includes a transistor T4 with a channel of the same type as transistor T3. Transistor T4 is assembled as a mirror of transistor T3, that is, here, the drain and the gate of transistor T3 are connected to each other, the source of transistor T4 is connected to node 101, and the gates of transistors T3 and T4 are interconnected. Still in this example, branch 402 further includes a transistor T5, for example, having a channel of the type opposite to that of transistor T4, coupling transistor T4 to node 102. Each branch 404*i* then includes a corresponding transistor T6*i* coupling output 108*i* of the branch to node 102. All transistors 1081, . . . , 108*i*, 108N are assembled as mirrors of transistor T5, that is, the drain and the gate of transistor T5 are connected to each other, the source of transistor T5 is connected to node 102, and the gates of transistors T5 and T6*i* are interconnected.

Various embodiments and variants have been described. Those skilled in the art will understand that certain features of these various embodiments and variants may be combined, and other variants will occur to those skilled in the art. In particular, it will be within the abilities of those skilled in the art to modify the polarity (positive or negative) of the described currents by means of various current mirrors, while keeping the operation described for device 1, that is, the current I1 supplied to circuit 104 is proportional to the current Iref modulated based on the sum of the inrush currents of regulators LDOi, so that voltages Vrefi increase when the sum of the inrush currents decreases.

Finally, the practical implementation of the described embodiments and variations is within the abilities of those skilled in the art based on the functional indications given hereabove. In particular, the implementation of circuits 202, 206, and 302 is within the abilities of those skilled in the art, for example, by implementing each of these circuits by means of one or a plurality of current mirrors.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A device, comprising:

one or more low drop-out voltage regulators;

a first circuit coupled to the one or more low drop-out voltage regulators, the first circuit configured to deliver N set-point voltages to the one or more low drop-out voltage regulators, wherein N is a quantity of the one or more low drop-out voltage regulators, and wherein each of the N set-point voltages is proportional to a first current, the first circuit having an associated resistor for each low drop-out voltage regulator, each resistor configured to conduct a fifth current proportional to the first current, a corresponding set-point voltage being available between terminals of the associated resistor; and a second circuit coupled to the first circuit, the second circuit configured to generate the first current proportional to a reference current modulated based on a sum of in-rush currents received from the one or more low drop-out voltage regulators.

2. The device of claim 1, wherein the second circuit is configured such that an absolute value of the first current increases in response to a decrease in the sum of in-rush currents received from the one or more low drop-out voltage regulators.

3. The device of claim 1, wherein the second circuit is configured to receive the reference current, the second circuit comprising:

a first terminal configured to receive a second current proportional to the reference current; and a third circuit coupled to the first terminal, the third circuit configured to:

draw a third current from the first terminal, and vary the third current in accordance with the sum of in-rush currents received from the one or more low drop-out voltage regulators, wherein the second circuit is configured to deliver the first current such that the first current is proportional to a fourth current drawn from the first terminal.

4. The device of claim 3, wherein the third circuit is configured such that an absolute value of the third current increases in response to an increase in the sum of in-rush currents received from the one or more low drop-out voltage regulators.

5. The device of claim 3, wherein the second current and the third current are both positive or both negative.

6. The device of claim 1, wherein the one or more low drop-out voltage regulators are configured to be powered ON with a same power supply voltage.

7. The device of claim 6, wherein the second circuit is configured to receive the reference current, the second circuit comprising:

a first terminal configured to receive a second current proportional to the reference current; and a third circuit coupled to the first terminal, the third circuit configured to:

draw a third current from the first terminal, and vary the third current in accordance with the sum of in-rush currents received from the one or more low drop-out voltage regulators, wherein the second circuit is configured to deliver the first current such that the first current is proportional to a fourth current drawn from the first terminal, and wherein the third circuit comprises:

a second terminal configured to receive the power supply voltage, a third terminal configured to receive a reference voltage, a fourth terminal, a first transistor having a drain terminal and a gate terminal coupled to the fourth terminal, a first switch configured to selectively couple the fourth terminal to the second terminal, a second switch coupled in series with the first transistor and configured to selectively couple the fourth terminal with the third terminal, a fourth circuit configured to draw a current proportional to the reference current from the fourth terminal, a corresponding capacitor for each of the one or more low drop-out voltage regulators, each respective capacitor coupling an output of a respective low drop-out voltage regulator to the fourth terminal, and a second transistor comprising:

a drain terminal coupled to the first terminal, a gate terminal coupled to the fourth terminal, and a source terminal coupled to the third terminal.

8. The device of claim 7, further comprising a control circuit coupled to the first switch and the second switch, the control circuit configured to turn OFF the first switch and turn ON the second switch during a powering ON of the one or more low drop-out voltage regulators.

9. The device of claim 8, wherein the control circuit is further configured to turn ON the first switch and turn OFF the second switch before the powering ON of the one or more low drop-out voltage regulators.

10. The device of claim 7, wherein the each respective capacitor coupling an output of a respective low drop-out voltage regulator has a value of at least 1,000,000 times smaller than a capacitor of a load coupled to an output of the respective low drop-out voltage regulator.

11. The device of claim 7, wherein the respective capacitor coupling an output of a respective low drop-out voltage regulator has a value of at least 10,000,000 times smaller than a capacitor of a load coupled to an output of the respective low drop-out voltage regulator.

12. The device of claim 7, wherein a dimension ratio of the second transistor is at least 30 times larger than a dimension ratio of the first transistor.

13. The device of claim 7, wherein a dimension ratio of the second transistor is at least 50 times larger than a dimension ratio of the first transistor.

14. The device of claim 6, further comprising a voltage converter configured to deliver the power supply voltage.

15. The device of claim 1, wherein the first circuit comprises a current mirror circuit comprising an input branch and N-number output branches, wherein the input branch is configured such that a current proportional to the first current flows through the input branch, and wherein each output branch comprises one of each respective resistor and configured such that the fifth current flows through the each respective resistor, and wherein N is equal to a quantity of one or more one or more low drop-out voltage regulators.

16. An integrated circuit, comprising:

one or more low drop-out voltage regulators;

a first circuit coupled to the one or more low drop-out voltage regulators, the first circuit configured to deliver N set-point voltages to the one or more low drop-out voltage regulators, wherein N is a quantity of the one or more low drop-out voltage regulators, and wherein each of the N set-point voltages is proportional to a first current, the first circuit having an associated resistor for each low drop-out voltage regulator, each resistor configured to conduct a fifth current proportional to the first current, a corresponding set-point voltage being available between terminals of the associated resistor; and a second circuit coupled to the first circuit, the second circuit configured to generate the first current proportional to a reference current modulated based on a sum of in-rush currents received from the one or more low drop-out voltage regulators.

17. The integrated circuit of claim 16, wherein the one or more low drop-out voltage regulators are configured to be powered ON with a same power supply voltage, and wherein the second circuit is configured to receive the reference current, the second circuit comprising:

a first terminal configured to receive a second current proportional to the reference current; and a third circuit coupled to the first terminal, the third circuit configured to:

draw a third current from the first terminal, and vary the third current in accordance with the sum of in-rush currents received from the one or more low drop-out voltage regulators, wherein the second circuit is configured to deliver the first current such that the first current is proportional to a fourth current drawn from the first terminal, and wherein the third circuit comprises:

a second terminal configured to receive the power supply voltage, a third terminal configured to receive a reference voltage, a fourth terminal, a first transistor having a drain terminal and a gate terminal coupled to the fourth terminal, a first switch configured to selectively couple the fourth terminal to the second terminal, a second switch coupled in series with the first transistor and configured to selectively couple the fourth terminal with the third terminal, a fourth circuit configured to draw a current proportional to the reference current from the fourth terminal, a corresponding capacitor for each of the one or more low drop-out voltage regulators, each respective capacitor coupling an output of a respective low drop-out voltage regulator to the fourth terminal, and a second transistor comprising:

a drain terminal coupled to the first terminal, a gate terminal coupled to the fourth terminal, and a source terminal coupled to the third terminal.

18. A method, comprising:

delivering, by a first circuit, N set-point voltages to one or more low drop-out voltage regulators, N being a quantity of the one or more low drop-out voltage regulators, and each of the N set-point voltages being proportional to a first current;

generating, by a second circuit, the first current proportional to a reference current modulated based on a sum of in-rush currents received from the one or more low drop-out voltage regulators;

receiving, by the second circuit, the reference current;

receiving, by a first terminal of the second circuit, a second current proportional to the reference current;

drawing, by a third circuit coupled to the first terminal, a third current from the first terminal; and varying, by the third circuit, the third current in accordance with the sum of in-rush currents received from the one or more low drop-out voltage regulators; and delivering, by the second circuit, the first current such that the first current is proportional to a fourth current drawn from the first terminal.

19. The method of claim 18, wherein the first circuit includes an associated resistor for each low drop-out voltage regulator, wherein each resistor is configured to conduct a fifth current proportional to the first current, and wherein a corresponding set-point voltage is available between terminals of the associated resistor.

20. The integrated circuit of claim 16, wherein the second circuit is configured to receive the reference current, the second circuit comprising:

a first terminal configured to receive a second current proportional to the reference current; and a third circuit coupled to the first terminal, the third circuit configured to:

draw a third current from the first terminal, and vary the third current in accordance with the sum of in-rush currents received from the one or more low drop-out voltage regulators, wherein the second circuit is configured to deliver the first current such that the first current is proportional to a fourth current drawn from the first terminal.

* * * * *